United States Patent
Prociw et al.

(10) Patent No.: US 9,116,663 B2
(45) Date of Patent: Aug. 25, 2015

(54) METHOD FOR CHANGING DEVICE MODES OF AN ELECTRONIC DEVICE CONNECTED TO A DOCKING STATION AND AN ELECTRONIC DEVICE CONFIGURED FOR SAME

(75) Inventors: Philip James Prociw, Waterloo (CA); William Ryan David Parton, Kitchener (CA); Bogdan James Tobola, Kitchener (CA); David Gerard Rich, West Bloomfield, MI (US)

(73) Assignee: BlackBerry Limited, Waterloo (CA)

( * ) Notice: Subject to any disclaimer, the term of this patent is extended or adjusted under 35 U.S.C. 154(b) by 183 days.

(21) Appl. No.: 13/334,136

(22) Filed: Dec. 22, 2011

(65) Prior Publication Data

US 2013/0162515 A1 Jun. 27, 2013

(51) Int. Cl.
*G06F 1/16* (2006.01)
*H04M 1/04* (2006.01)
*H04M 1/725* (2006.01)
*G06F 3/14* (2006.01)
*G09G 5/00* (2006.01)

(52) U.S. Cl.
CPC .............. *G06F 1/1616* (2013.01); *G06F 1/165* (2013.01); *G06F 1/1626* (2013.01); *G06F 1/1632* (2013.01); *G06F 3/14* (2013.01); *H04M 1/04* (2013.01); *H04M 1/72527* (2013.01); *G09G 5/003* (2013.01); *G09G 2354/00* (2013.01); *G09G 2370/20* (2013.01)

(58) Field of Classification Search
None
See application file for complete search history.

(56) References Cited

U.S. PATENT DOCUMENTS

| | | | |
|---|---|---|---|
| 6,231,371 B1 | 5/2001 | Helot | |
| 2004/0224638 A1 | 11/2004 | Fadell et al. | |
| 2004/0268005 A1* | 12/2004 | Dickie | 710/303 |
| 2006/0161871 A1* | 7/2006 | Hotelling et al. | 715/863 |
| 2010/0250818 A1* | 9/2010 | Gill et al. | 710/304 |
| 2011/0138336 A1* | 6/2011 | Kim | 715/848 |
| 2011/0222784 A1* | 9/2011 | Rowe et al. | 382/218 |
| 2012/0054401 A1* | 3/2012 | Cheng | 710/304 |
| 2013/0024812 A1* | 1/2013 | Reeves et al. | 715/810 |

FOREIGN PATENT DOCUMENTS

| | | | | |
|---|---|---|---|---|
| GB | 2479996 A * | 2/2011 | | G06F 9/44 |
| GB | 2 479 996 | 11/2011 | | |
| JP | 2011 170675 | 9/2011 | | |
| JP | 2011 170675 A | 9/2011 | | |
| JP | 2011170675 A * | 9/2011 | | |
| WO | WO 2010 110961 | 9/2010 | | |

OTHER PUBLICATIONS

Extended European Search Report; EP 11195139.8; Nov. 2, 2012.
Partial European Search Report; EP 11195139.8; Jul. 2, 2012.

(Continued)

*Primary Examiner* — Kent Chang
*Assistant Examiner* — Nathan Brittingham
(74) *Attorney, Agent, or Firm* — Ridout & Maybee LLP (57) ABSTRACT

The present disclosure provides a docking station for docking one or multiple portable electronic devices, such as a tablet and a mobile telephone or smartphone. The present disclosure provides a method for changing device modes of an electronic device connected to a docking station, as well as an electronic device and a docking station configured for same.

20 Claims, 7 Drawing Sheets

(56) References Cited

OTHER PUBLICATIONS

Author Unknown, Introducing Central Station, http://www.samsung.com/us/article/introducing-central-station, May 4, 2011.

Galen Gruman, "Test-driving the Motorola Atrix's Lapdock: Move over, Chromebooks: This Android/Linux combo could be a better netbook—or even tablet—alternative", InfoWorld, http://www.infoworld.com/d/mobile-technology/test-driving-the-motorola-atrixs-lapdock-072, Mar. 4, 2011.

Scott Stein, "How does the Motorola Atrix 4G Lapdock compare with a laptop?", http://news.cnet.com/8301-17938_105-20031251-1.html, Feb. 9, 2011.

Office Action dated Jun. 12, 2014 from the Canadian Patent Office for the corresponding Canadian Patent Application No. 2,798,684.

Winnik, Arthur—Canadian Intellectual Property Office, "Examiner's Requisition" for corresponding Canadian Patent Application No. 2,798,684 dated Apr. 24, 2015, Canada.

* cited by examiner

METHOD FOR CHANGING DEVICE MODES OF AN ELECTRONIC DEVICE CONNECTED TO A DOCKING STATION AND AN ELECTRONIC DEVICE CONFIGURED FOR SAME

TECHNICAL FIELD

The present disclosure relates to portable electronic devices, and more particularly to a method for changing device modes of an electronic device connected to a docking station and an electronic device configured for same.

BACKGROUND

Electronic devices, including portable electronic devices, are often enabled to work with "external" auxiliary input/output devices such as a mouse or other pointing device. The external device may be connected to the electronic device using a physical connection, such as a Universal Serial Bus (USB) cable, between corresponding ports on the devices. Alternatively, the external device may be connected to the electronic device using a wireless connection such as Bluetooth™. External input/output devices are sometimes provided as part of a docking station (commonly referred to as a "dock") which may also provide auxiliary power and/or communications functions. While existing solutions serve these purposes, conventional solutions typically require a dedicated auxiliary input/output device (such as a corded/wired or wireless mouse) or a docking station. There remains a need for more convenient solutions for providing external input/output devices and enabling the use of external input/output devices.

DETAILED DESCRIPTION OF EXAMPLE EMBODIMENTS

Reference will now be made to the accompanying drawings which show, by way of example, example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without these details. In other instances, well-known methods, procedures, and components have not been described in detail to avoid obscuring the example embodiments described. The description is not to be considered as limited to the scope of the example embodiments described herein. Any reference to direction or orientation herein is for convenience and is not intended to be limiting unless explicitly stated herein.

The present disclosure generally relates to portable electronic devices such as handheld electronic devices. The portable electronic devices may be portable electronic devices with or without wireless communication capabilities. Examples of handheld electronic devices include, but are not limited to, pagers, mobile telephones, smartphones, tablet computing devices, wireless organizers, personal digital assistants, electronic gaming devices, digital photograph albums, digital cameras, and so forth. The portable electronic devices, when mobile telephones or smartphones, may be provided in any form factor including, but not limited to a bar-style, brick-style, slider-style or flip-style device.

The present disclosure provides a docking station for docking one or multiple portable electronic devices, such as a tablet and a mobile telephone or smartphone. The present disclosure provides a method for changing device modes of an electronic device connected to a docking station, as well as an electronic device and a docking station configured for same.

In accordance with one example embodiment, there is provided a method for changing device modes of an electronic device connected to a docking station, comprising: enabling an output mode on a first electronic device when an object is outside a threshold proximity of the first electronic device, when a threshold duration of inactivity on the first electronic device has been exceeded or both; and enabling an input mode on the first electronic device when an object is within the threshold proximity of the first electronic device or an input is received on the first electronic device.

In accordance with another example embodiment, there is provided a portable electronic device, comprising: a processor; a proximity sensor coupled to the processor; at least one input device coupled to the processor; wherein the processor is configured for performing the method(s) set forth herein.

In accordance with yet a further example embodiment, there is a docking station comprising: a base defining a nest for at least partially receiving a smartphone, wherein the nest is located towards a front of the docking station; a support located towards a rear of the docking station for supporting a tablet at an obtuse angle relative to the base; a communications bus housed within the base; a keyboard coupled to the communications bus; a first data port located in the nest and coupled to the communications bus; and a second data port located towards the rear of the docking station and coupled to the communications bus.

In accordance with yet a further embodiment of the present disclosure, there is provided a computer program product comprising a computer readable medium having stored thereon computer program instructions for implementing a method on a portable electronic device and/or docking station, the computer executable instructions comprising instructions for performing the method(s) set forth herein.

Figure 1:
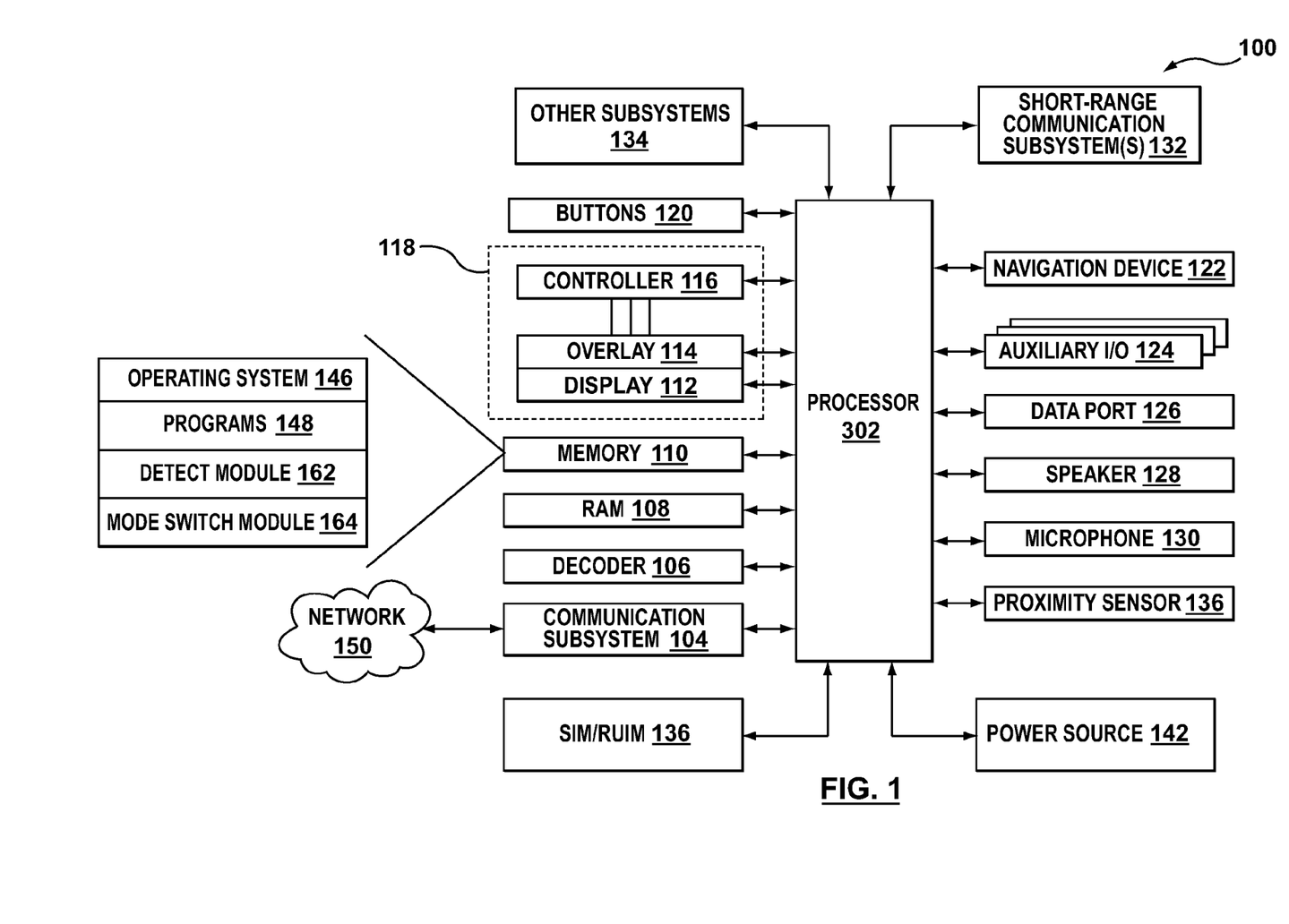
FIG. 1 is a block diagram of components of a portable electronic device in accordance with one example embodiment of the present disclosure.

Reference is made to FIG. 1, which illustrates in block diagram form, a portable electronic device 100 to which example embodiments described in the present disclosure can be applied. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110 such as flash memory, a display 112 (such as a liquid crystal display (LCD)) with a touch-sensitive overlay 114 operably coupled to an electronic controller 116 that together comprise a touch-sensitive display 118, one or more keys or buttons 120, a navigation device 122, one or more auxiliary input/output (I/O) subsystems 124, a data port 126, a speaker 128, a microphone 130, a short-range wireless communication subsystem(s) 132, other device subsystems 134 and a proximity sensor 136. The components of the portable electronic device 100 are coupled via a communications bus (not shown) which provides a communication path between the various components. User-interaction with a graphical user interface (GUI) rendered and displayed on the touch-sensitive display 118 via the processor 102 is performed using input devices including the touch-sensitive display 118. The GUI displays user interface screens on the display 112 which display information such as text, characters, symbols, images, icons, and other items.

Figure 2:
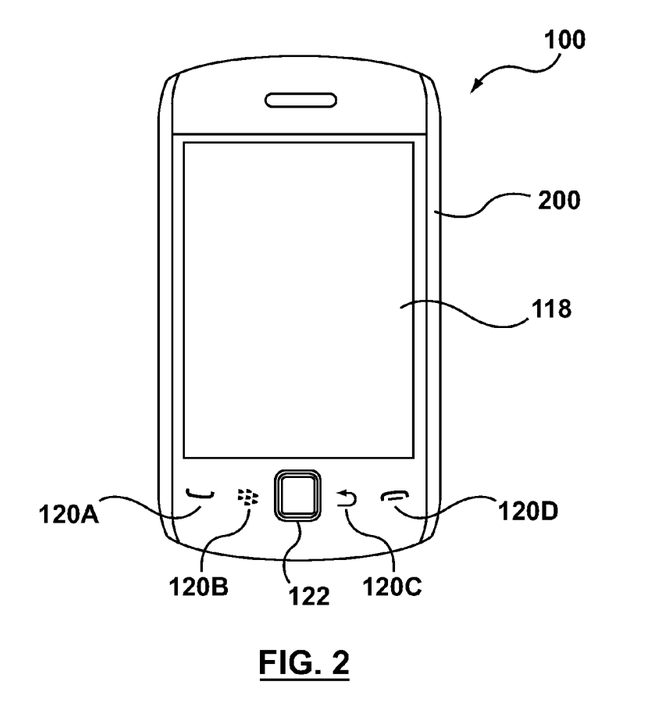
FIG. 2 is a front view of an example of a portable electronic device in a portrait orientation.

Referring to FIG. 2, the buttons 120, represented individually by references 120A, 120B, 120C and 120D, are located below the touch-sensitive display 118 on a front face of the portable electronic device 100. The buttons 120 generate corresponding input signals when activated. The buttons 120 may be constructed using any suitable button (or key) construction such as, for example, a dome-switch construction. The actions performed by the device 100 in response to activation of respective buttons 120 may be context-sensitive. The action performed depends on a context that the button was activated. The context may be, but is not limited to, a device state, application, screen context, selected item or function, or any combination thereof.

The buttons 120, in the shown embodiment, are an answer (or send) button 120A, menu button 120B, escape (or back) button 120C, and a hang up (or end) button 120D. The send/answer button 120A may be used for answering an incoming voice call, invoking a menu for a phone application when there is no voice call in progress, or initiating an outbound voice phone call from the phone application when a phone number is selected in the phone application. The menu button 120B may be used to invoke a context-sensitive menu comprising context-sensitive menu options. The escape/back button 120C may be used to cancel a current action, reverse (e.g., "back up" or "go back") through previous user interface screens or menus displayed on the touch-sensitive display 118, or exit the current application 148. The end/hang up button 120D may be used to end a voice call in progress or hide the current application 148.

The navigation device 122 may be a depressible (or clickable) joystick such as a depressible optical joystick, a depressible trackball, a depressible scroll wheel, or a depressible touch-sensitive trackpad or touchpad. When the navigation device 122 is a depressible optical joystick as shown in FIG. 2, movements of the user's finger, such as vertical and horizontal movements, are detected by an optical sensor of the optical joystick. Up, down, left or right movements detected by the optical joystick are interpreted as corresponding up, down, left or right navigation commands. Typically, navigation via the optical joystick is by 1:1 movement so that each directional gesture or movement detected by the optical joystick causes a corresponding navigation movement.

The auxiliary I/O subsystems 124 may include other input devices such as a keyboard or keypad.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The short-range wireless communication subsystem(s) 132 provides a short-range wireless communication interface. The short-range wireless communication subsystem(s) 132 may include one or more subsystems of the same or different type. The short-range wireless communication subsystems 132 may include, but are not limited to, Bluetooth®, an infrared (IR) subsystem such as Infrared Data Association (IrDA), an IEEE 802.15.3a subsystem (also referred to as UltraWideband (UWB)), Z-Wave subsystem, ZigBee subsystem or other suitable short-range wireless communication interface.

The portable electronic device 100 includes an operating system 146 and software applications 148 that are executed by the processor 102 and are typically stored in a persistent, updatable storage such as the memory 110. Additional applications 148 may be loaded onto the portable electronic device 100 through the wireless network 150, the auxiliary I/O subsystem 124, the data port 126, the short-range wireless communication subsystem(s) 132, or any other suitable subsystem 134. The applications 148 include a detect module 162 for detecting connect and disconnect events in which the portable electronic device 100 is connected (or docked) or disconnected (or undocked) to a docking station 300 (FIG. 3), and a mode switch module 164 for switching modes of the portable electronic device 100. The detect module 162 and mode switch module 164 may each be a standalone application or a part of the operating system 146.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

FIG. 2 shows a front view of an example of the portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Different types of touch events detected by the touch-sensitive display 118, such as touch gestures, are differentiated from each other by the duration of respective touch events. A touch and hold gesture is detected or recognized when a touch event occurs for a duration which is greater than or equal to a threshold duration. The threshold duration may be, for example, 400 milliseconds in some embodiments. Other threshold durations are possible. A tap gesture is detected or recognized when a touch event occurs for a duration which is less than the threshold duration. A tap gesture requires both a finger down and lift off within the threshold duration to be detected by the touch-sensitive display 118. A touch and hold gesture requires only a finger down for the threshold duration before the touch-sensitive display 118 detects the touch and hold gesture.

A one-finger touch and hold gesture occurs when a user touches a selectable onscreen item on the touch-sensitive display 118, such as a button or menu item, with one finger and holds the finger in contact with the touch-sensitive display 118 for a duration which exceeds the threshold duration.

A two-finger touch and hold gesture occurs when a user touches a selectable onscreen item on the touch-sensitive display 118 with two-fingers and holds both fingers in contact with the touch-sensitive display 118 for a duration which exceeds the threshold duration. Touching a selectable onscreen item comprises touching a location of the touch-sensitive display 118 which is coincident with the selectable onscreen item displayed on the display screen 112. A location is coincident with the selectable onscreen item in that the centroid of the touch event is within an input area of the user interface screen assigned for receiving input for activating the selectable onscreen item. The input area of the selectable onscreen item may be different than the displayed area of the selectable onscreen item on the display screen 112 in some embodiments, typically the input area being larger than the displayed area in such embodiments to accommodate touch offset of the user.

The result of a tap, one-finger touch and hold gesture, or two-finger touch and hold gesture is context dependent.

A swipe gestures has a single direction which is evaluated with respect to an initial contact point (e.g., centroid) of the touch event at which the finger makes contact with the touch-sensitive display 118 and a terminal or ending contact point at which the finger is lifted from the touch-sensitive display 118 while in motion. This may reduce processing as the processor 102 does not utilize the information from all contact points of the entire gesture to resolve the direction of the touch gesture.

Examples of swipe gestures include a horizontal swipe gesture, a vertical swipe gesture, and a diagonal swipe gesture. A horizontal swipe gesture typically comprises an initial contact with the touch-sensitive display 118 towards its left or right edge to initialize the gesture, followed by a horizontal movement of the point of contact from the location of the initial contact to the opposite edge while maintaining continuous contact with the touch-sensitive display 118, and a breaking of the contact at the opposite edge of the touch-sensitive display 118 to complete the horizontal swipe gesture. Similarly, a vertical swipe gesture typically comprises an initial contact with the touch-sensitive display 118 towards its top or bottom edge to initialize the gesture, followed by a vertical movement of the point of contact from the location of the initial contact to the opposite edge while maintaining continuous contact with the touch-sensitive display 118, and a breaking of the contact at the opposite edge of the touch-sensitive display 118 to complete the vertical swipe gesture.

A diagonal swipe gesture typically comprises an initial contact with the touch-sensitive display 118 towards a corner to initialize the gesture, followed by a diagonal movement of the point of contact from the location of the initial contact to the opposite corner while maintaining continuous contact with the touch-sensitive display 118. Using the initial contact point and the end contact point, the processor 102 determines the direction of the gesture. For example, a horizontal swipe gesture could correspond to either a left or right direction.

Swipe gestures can be of various lengths, can be initiated in various places on the touch-sensitive display 118, and need not span the full dimension of the touch-sensitive display 118. In addition, breaking contact of a swipe can be gradual in that contact pressure on the touch-sensitive display 118 is gradually reduced while the swipe gesture is still underway.

The touch-sensitive display 118 is described herein in the context of fingers of a device user for purposes of convenience only. It will be appreciated that a stylus or other object may be used for interacting with the touch-sensitive display 118 depending on the type.

The proximity sensor 136 may be of any suitable type including, but not limited to, an infrared sensor, a light sensor or a motion sensor. The proximity sensor 136 determines whether an object such as user's hand is within a threshold proximity of the proximity sensor 136. The threshold proximity may be any suitable distance and may be configurable. The threshold proximity is typically less than 25 cm and more typically less than 10 cm. The proximity sensor 136 comprises at least one sensor element which is coupled to the processor 102 and which is controlled by one or a combination of a monitoring circuit and operating software. In at least some embodiments, the proximity sensor 136 comprises an infrared sensor. Infrared sensors are typically very accurate and thereby provide the possibility for more precise control by allowing the threshold proximity to be more precisely set and more accurately monitored.

Figure 3:
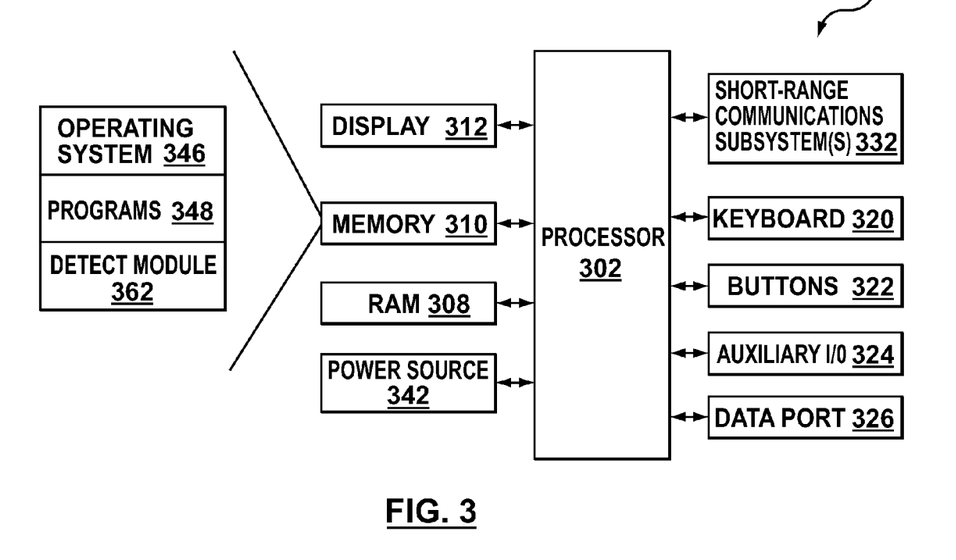
FIG. 3 is a block diagram of components of a docking station in accordance with one example embodiment of the present disclosure.

Reference is now made to FIG. 3 which illustrates in block diagram form a docking station 300 (also known as a "dock") in accordance with one example embodiment. The docking station 300 is an electronic device which connects to one or more portable electronic devices 100. The docking station 300 expands the capabilities of the connected portable electronic devices 100 by providing supplemental input and/or output capabilities, depending on the operational capabilities of the connected portable electronic devices 100 and the configuration of the docking station 300 and the connected portable electronic devices 100.

The docking station 300 includes multiple components, such as a processor 302 that controls the overall operation of the docking station 300. The processor 302 interacts with other components, such as RAM 308, memory 310 such as flash memory, a display 312 such as an LCD, a keyboard 320, one or more control buttons 322, one or more auxiliary input/output (I/O) subsystems 324, one or more data ports 326, a short-range wireless communication subsystem(s) 332, and a power source 342 such as a power supply which powers the docking station 300. The components of the docking station 300 are coupled via a communications bus (not shown) which provides a communication path between the various components. As described below, in some embodiments the display 312 of the docking station 300 may be that of a connected portable electronic device 100 such as a tablet computing device (also known as a "tablet") rather than a dedicated display of the docking station 300. In other embodiments, the processor 302 may be omitted and all processing functions are performed using the processor 102 of the connected device(s).

The keyboard 320 is typically a "full keyboard" having a plurality of keys in which a portion of the keys have a unique alphabetic letter associated with each key. This one-to-one pairing between letters and keys will be understood to persons of ordinary skill in the art and will not be described in detail herein. The alphabetic letters are typically configured in a familiar QWERTY, QWERTZ, AZERTY, or Dvorak layout known in the art to facilitate user input. The control buttons 322 may include a power toggle button for powering on/off the docking station 300 and possibly a mode toggle button for switching the mode of a connected device. The auxiliary I/O subsystems 324 may include other input devices.

The processor 302 operates under stored program control with software stored in the memory 310 or firmware. In at least some examples, the stored programs include an operating system 346 and possibly software applications 348 that are executed by the processor 302. The applications 348 may include a detect module 362 for detecting connect and disconnect events in which a portable electronic device 100 is connected (or docked) or disconnected (or undocked) to the docking station 300. The detect module 362 may be a standalone application or a part of the operating system 346.

Portable electronic devices 100 can be connected to the docking station 300 using the one or more data ports 326 and/or optionally the short-range wireless communication subsystem(s) 332 depending on the operational capabilities of the connected portable electronic devices 100 and the configuration of the docking station 300 and the connected portable electronic devices 100. The one or more data ports 326 may be any suitable type of data port including, but not limited to, a universal serial bus (USB) port, Firewire™ port, or a proprietary data port. The one or more data ports 326 may include data ports of different types or may each be of the same type, depending on the supported portable electronic devices 100.

The short-range wireless communication subsystem(s) 332 provides a short-range wireless communication interface between the docking station 300 and supported portable electronic devices 100. The short-range wireless communication subsystem(s) 332 include one or more subsystems of the same type as the short-range wireless communication subsystem(s) 132 of the supported portable electronic devices 100. The short-range wireless communication subsystems 332 may include, but are not limited to, Bluetooth®, an IR subsystem such as IrDA, an IEEE 802.15.3a subsystem (or UWB), Z-Wave subsystem, ZigBee subsystem or other suitable short-range wireless communication interface. Connection between the docking station 300 and the supported portable electronic devices 100 typically involves pairing the docking station 300 with a supported portable electronic device 100 to enable short-range wireless communications between the devices.

Processes for pairing devices to enable short-range wireless communications between the devices are well known. The portable electronic device 100 receives identifying information (such as a name and Media Access Control (MAC) address) from the docking station 300 during the pairing process, and device parameters and configuration information are exchanged. The pairing information is stored in a profile (e.g., Bluetooth profile in the case of a Bluetooth connection) in the memory 110, 310 of the portable electronic device 100 and docking station 300, respectively.

When more than one portable electronic device 100 is connected to the docking station 300, the connected portable electronic devices 100 may have a master-slave relationship in which the operation of one portable electronic device 100 is controlled by another portable electronic device 100, as will be described in more detail below.

Figure 4:
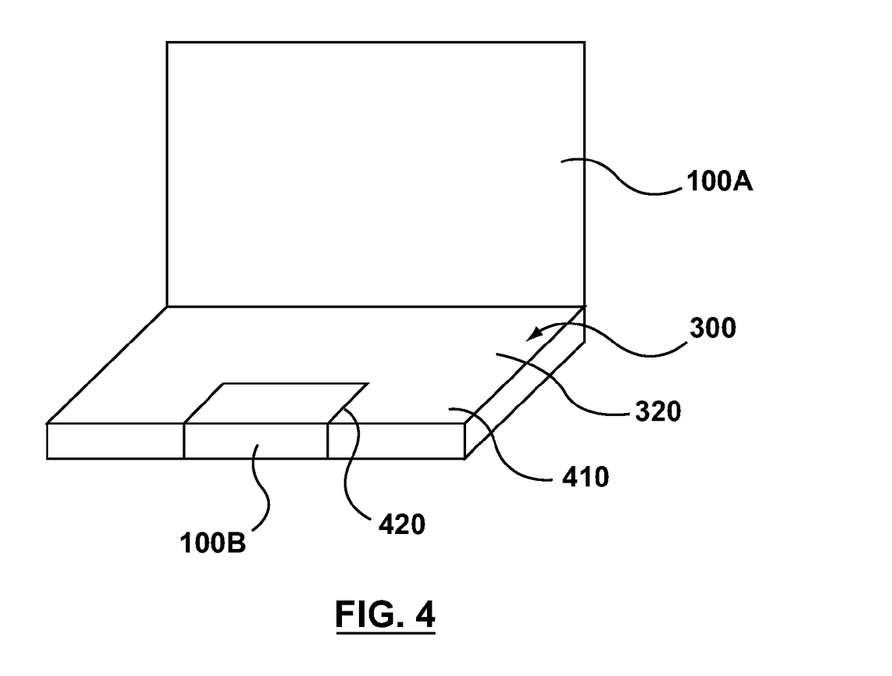
FIG. 4 is a diagrammatic view of a docking station in accordance with one example embodiment of the present disclosure having both a tablet and a handheld electronic device connected thereto.

Reference is now made to FIGS. 4, 6A-6D, which illustrate in diagrammatic form a docking station ("dock") 300 in accordance with one example embodiment of the present disclosure. In the shown embodiment, the docking station 300 is configured to dock up to two portable electrical devices 100, in particular, the docking station 300 is configured to dock both a tablet 100A and a handheld electronic device 100B, such as a mobile telephone or smartphone. In FIG. 4. The docking station 300 provides an accessory which can be used to increase the functionality of the handheld electronic device 100B, the tablet 100A, or both, and provide an enriched user experience. The combined resources provided by the handheld electronic device 100B and the tablet 100A present an opportunity to accomplish tasks on the docking station 300 that would have normally been completed on a laptop.

The docking station 300 provides a handheld electronic device 100B with an interface for connecting to a built-in display 312 of the docking station 300, such as a high-definition (HD) display, or a tablet 100A, which may also be provided with an HD display, in a form factor comparable to a laptop. In this way, the functionality of a conventional laptop computer may be emulated using a user's handheld electronic device 100B and/or tablet 100A. This, advantageously, eliminates the need for a user who has a handheld electronic device 100B and/or tablet 100A to own or carry a laptop computer. Thus, users can carry less and accomplish more. A further advantage is that additional battery capacity may be provided by utilising the battery of both the handheld electronic device 100B and tablet 100A, for example, using a power sharing mechanism. Yet a further advantage is that additional input devices, such as a physical keyboard, may be provided. This is particularly advantage when the handheld electronic device 100B includes a touch-sensitive display 118 but not a physical keyboard. Yet further advantages are provided by the emulation of the form factor of a conventional laptop computer as well as the possibility for the provision of additional inputs, outputs and other resources (and memory) of the docking station 300.

When a handheld electronic device 100B is connected to the docking station 300, the display 112 of the handheld electronic device 100B can be used as a secondary display (e.g., auxiliary output device) and the display 312 of the docking station 300 or the display of the tablet 100A, depending on the embodiment, can be used as a primary display. The primary display may be used to display higher priority content (e.g., primary content) whereas the secondary display may be used to display lower priority content (e.g., secondary content), such as new messages, without the need to consume power on the larger primary display. The interaction between the smaller secondary display and the larger primary display may also provide additional information, for example, a homescreen could be displayed on the secondary display of the handheld electronic device 100B, while applications 148 are displayed on the primary display of the tablet 100A.

As noted above, the secondary display is used for displaying secondary content while the primary display is used for displaying primary content. The primary content may comprise a foreground (or active) application of the handheld electronic device 100B. Alternatively, the primary content may comprise an application or other content which has been preselected, for example, by a user, an information technology (IT) administrator, or manufacturer. The primary content may be configurable. The secondary content displayed on the secondary display may comprise a message list, a notification screen or view in which notifications are displayed, a tool or widget, a graphical user interface (GUI) of an application 148 of the handheld electronic device 100B (e.g., such as a GUI of a media player application), or a homescreen of the handheld electronic device 100B. The secondary content may be an application switcher tool or widget for switching the foreground (active) application on the primary display. The secondary content may depend on the foreground (active) application displayed on the primary display.

When a handheld electronic device 100B is connected to the docking station 300, the handheld electronic device 100B may also be used as an auxiliary input device which supplements inputs from the keyboard 320 and other input devices of the docking station 300 when the handheld electronic device 100B is connected to the docking station 300. In one example embodiment, the touch-sensitive display 118 of the handheld electronic device 100B is enabled while connected to the docking station 300 and used as a navigational input device which interprets touch inputs received by the touch-sensitive display 118 as navigational inputs for navigating a user interface displayed on the display 312 of the docking station 300 or a display of a tablet 100A connected to the docking station 300. When operating as a navigational input device, conventional touch gestures recognized by touch-enabled portable electronic devices, such as the directional gestures described earlier, may be performed on the touch-sensitive display 118 to cause navigation in a GUI displayed on the display 312 of the docking station 300 or a display of a tablet 100A connected to the docking station 300.

It will be appreciated that when the handheld electronic device 100B is connected to the docking station 300, the handheld electronic device 100B may be used in an input mode for auxiliary input, or output mode for auxiliary output, or possibly both. For example, when the handheld electronic device 100B includes a touch-sensitive display 118, the touch-sensitive display 118 can be used for input, output, or a combination thereof as is typically the case with a touch-sensitive display 118.

In the described embodiments, the tablet 100A is used primarily as a display device and the handheld electronic device 100B is used primarily as a controller and a data source for content, e.g. the primary and secondary content which is displayed. The handheld electronic device 100B acts as a master and the tablet 100A acts as a slave as in a conventional master-slave paradigm.

FIGS. 4, 6A-6D, illustrate one embodiment of the docking station 300 in which the docking station 300 has a docking structure which comprises a base 410. The base 410 defines a nest 420 for at least partially receiving the handheld electronic device 100B. The nest 420 typically includes a first data port 326 (not shown) which acts as a physical interface for connecting the handheld electronic device 100B to the docking station 300. A wireless interface may be provided by the short-range wireless communication subsystem(s) 332 in addition to, or instead of, the data port 326 in the nest 420. The communications bus (not shown) of the docking station 300 is housed within the base 410.

The nest 420 is physically configured to expose the display (i.e., the touch-sensitive display 118) of the handheld electronic device 100B for user interaction therewith when the handheld electronic device 100B is connected to the docking station 300. The nest 420 is located towards a front of the docking station 300 in the location typically allocated for a trackpad or touchpad in a conventional laptop computer. This placement facilitates user interaction with a connected handheld electronic device 100B, for example, using the user's fingers.

The docking station 300 also includes a second data port 326 (not shown) towards a rear of the docking station 300 which acts as physical interface for connecting the tablet 100A to the docking station 300. The docking station 300 also includes a support (not shown) located towards the rear of the docking station for supporting and optionally at least partially receiving the tablet 100A when connected so that the tablet 100A is held in a position equivalent to a normal operating position of the display of a conventional laptop computer during use. The support is typically an elongate member located at an obtuse angle (greater than 90 degrees and less than 180 degrees) relative to the base 410 so that the tablet 100A is held in a position equivalent to a normal operating position of the display of a conventional laptop computer during use. The support may be rotatable or otherwise adjustable similar to the display of a conventional laptop computer so as to provide a range of operating positions in the same manner as a conventional laptop computer. This allows users to adjust the position of the tablet 100A to suit their personal preferences.

Figure 7:
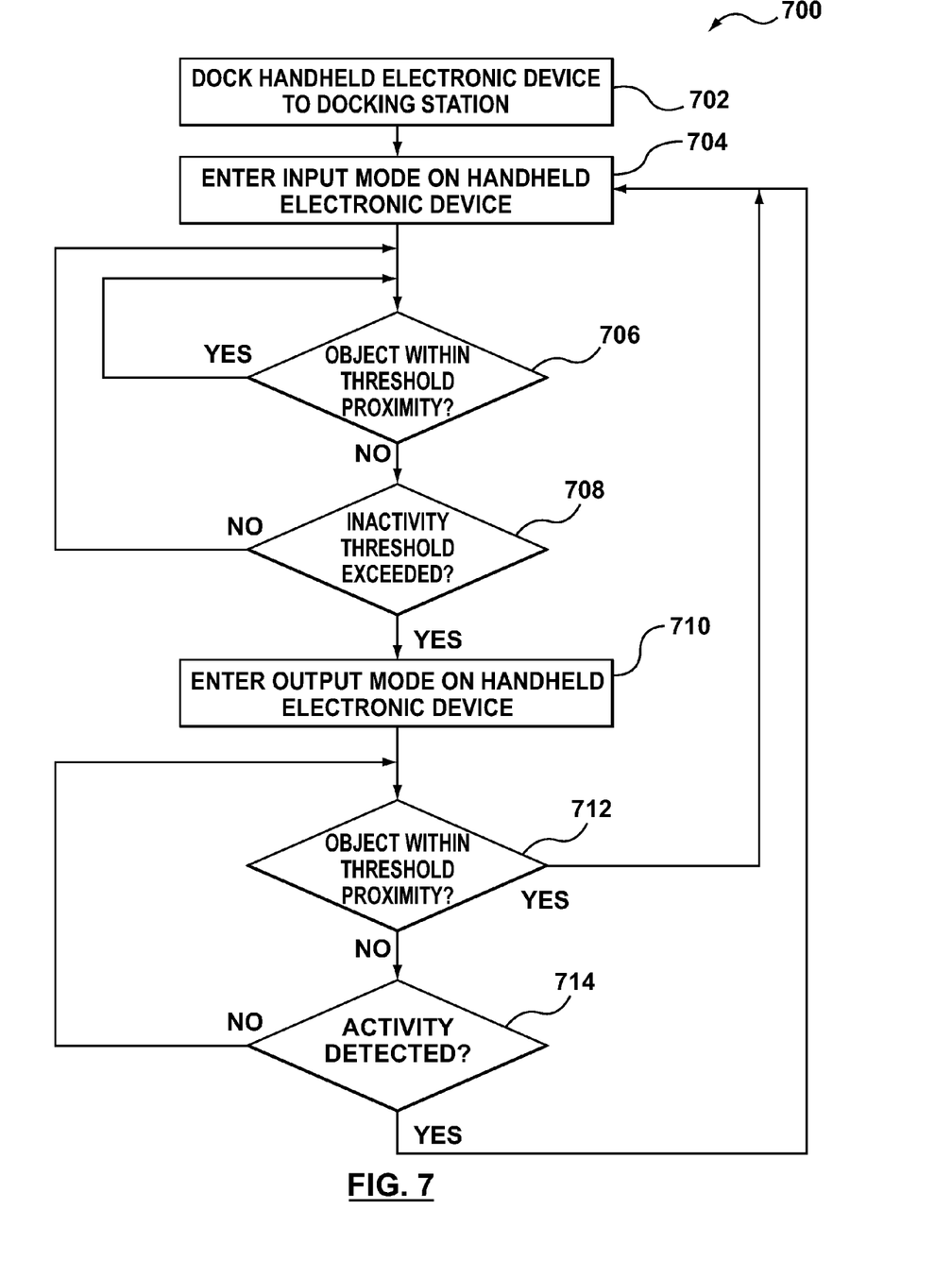
FIG. 7 is a flowchart of a method for changing device modes of an electronic device connected to a docking station in accordance with one embodiment of the present disclosure.

FIG. 7 is a flowchart of a method 700 for changing device modes of an electronic device connected to a docking station in accordance with one embodiment of the present disclosure.

The method 700 may be carried out by software executed, for example, by the processor 102 of the handheld electronic device 100B. Coding of software for carrying out the method 700 is within the scope of a person of ordinary skill in the art given the present disclosure. The method 700 may contain additional or fewer processes than shown and/or described, and may be performed in a different order. Computer-readable code executable by at least one processor 102 of the handheld electronic device 100B to perform the method 700 may be stored in a computer-readable medium such as the memory 110.

First, the handheld electronic device 100E is connected to the docking station 300 (702). When the handheld electronic device 100E is first connected, the handheld electronic device 100B typically enters an input mode (704). The input mode, in at least some embodiments, comprises operating the touch-sensitive display 118 of the handheld electronic device 100B as an input device. Alternatively, rather than entering the input mode, the handheld electronic device 100E may idle waiting to be enabled or waiting for input selecting the device mode, for example, from a mode toggle button on the docking station 300 or handheld electronic device 100B (which may be a secondary function of a designated key or button on the handheld electronic device 100B).

For example, in some embodiments, the input devices of the handheld electronic device 100B may be disabled when the handheld electronic device 100B is docked to the dock 300. The disabling may occur automatically in response to detecting connect events in which the device 100B is docked to the dock 300. Similarly, the input devices of the handheld electronic device 100B may be automatically enabled in response to detecting disconnect events in which the device 100B is disconnected from the dock 300. Connect and disconnect events are detected using, at least in part, the detect module 162 which monitors wired and/or wireless connections to the handheld electronic device 100B. In such cases, the handheld electronic device 100B idles waiting to be enabled or waiting for input selecting the device mode rather than entering the input mode.

In the input mode, the touch-sensitive display 118 of the handheld electronic device 100B may be operated as a navigational input device which interprets touch inputs received by the touch-sensitive display 118 as navigational inputs for navigating a user interface displayed on a display 312 of the docking station 300, or a display (not shown) of a tablet 100A connected to the docking station 300. It is possible that other input devices of the handheld electronic device 100B may also be used to receive input in the input mode in addition to, or possibly instead of, the touch-sensitive display 118.

The handheld electronic device 100B, when in the input mode, monitors whether an object such as a user's hand is within a threshold proximity of the handheld electronic device 100B in accordance with proximity data measured by the proximity sensor 136 (706). The handheld electronic device 100B, when in the input mode, also monitors whether the touch-sensitive display 118 has been inactive for more than a threshold duration of inactivity (708). Inactivity of the touch-sensitive display 118 occurs when touch inputs are not detected by the touch-sensitive display 118. The order of operations 706 and 708 could be reversed in other embodiments.

When an object is not within the threshold proximity of the handheld electronic device 100B (i.e., the user's hand is not hovering or touching the touch-sensitive display 118, or otherwise near the handheld electronic device 100B) and when a threshold duration of inactivity has been exceeded, an output mode on the handheld electronic device 100B is enabled (710). If other input devices of the handheld electronic device 100B are used to receive input in the input mode, inactivity occurs when all of the input devices of the handheld electronic device 100B used in the input mode do not receive an input. Input received by any of the input devices of the handheld electronic device 100B being used in the input mode is sufficient to constitute activity.

When in the output mode, primary content from the handheld electronic device 100B is displayed on the display of the tablet 100A connected to the docking station 300 and secondary content from the handheld electronic device 100B is displayed on the display 112 of the handheld electronic device 100B, which may be a touch-sensitive display 118. The display of the tablet 100A connected to the docking station 300 is operated by the handheld electronic device 100B as a primary display for displaying the primary content. The display of the tablet 100A is typically a touch-sensitive display. The secondary content may comprise a message list, a notification screen in which notifications are displayed, a widget, a GUI of an application 148 of the handheld electronic device 100B, or a homescreen of the handheld electronic device 100B. GUIs of applications 148 of the handheld electronic device 100B which are suitable for display in the secondary content area of the display 112 are commonly used applications 148 which do not require large screen areas, such a media player application or social media application such as Facebook™.

Figure 5A:
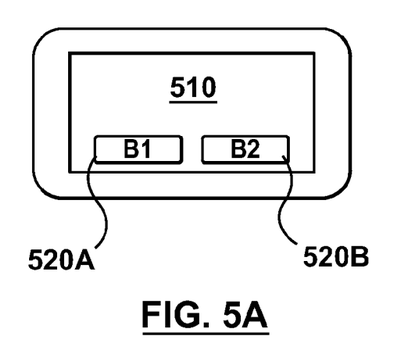
FIG. 5A is a schematic view of a portable electronic device displaying a user interface screen of an input mode of the portable electronic device in accordance with one example embodiment of the present disclosure.
Figure 5B:
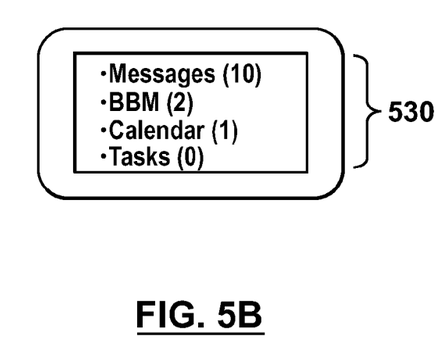
FIG. 5B is a schematic view of a portable electronic device displaying a user interface screen of an output mode of the portable electronic device in accordance with another example embodiment of the present disclosure.
Figure 6A:
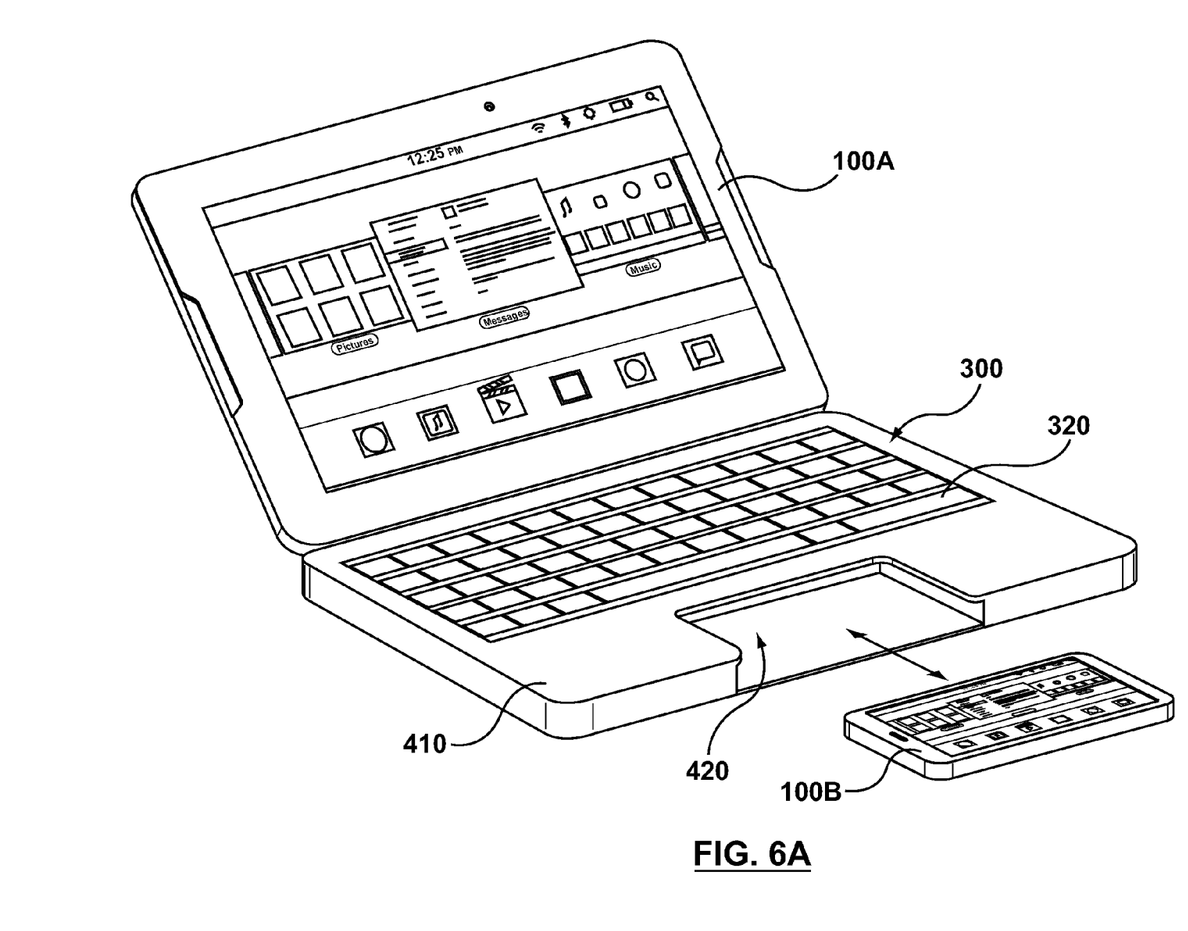
FIG. 6A is a perspective view of a docking station in accordance with one example embodiment of the present disclosure having both a tablet and a handheld electronic device for docking to the docking station.
Figure 6B:
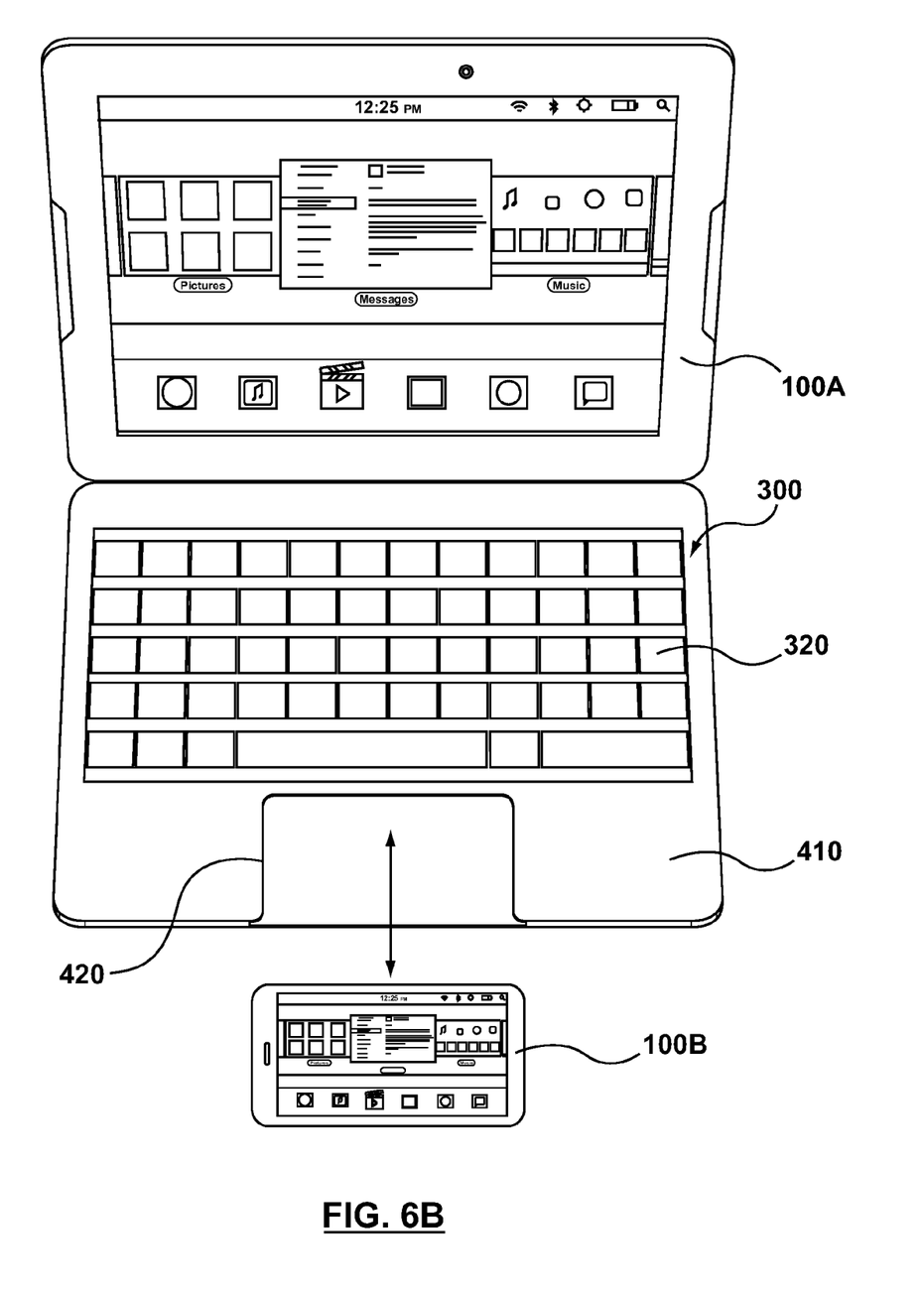
FIG. 6B is a top view of the docking station of FIG. 6A.
Figure 6C:
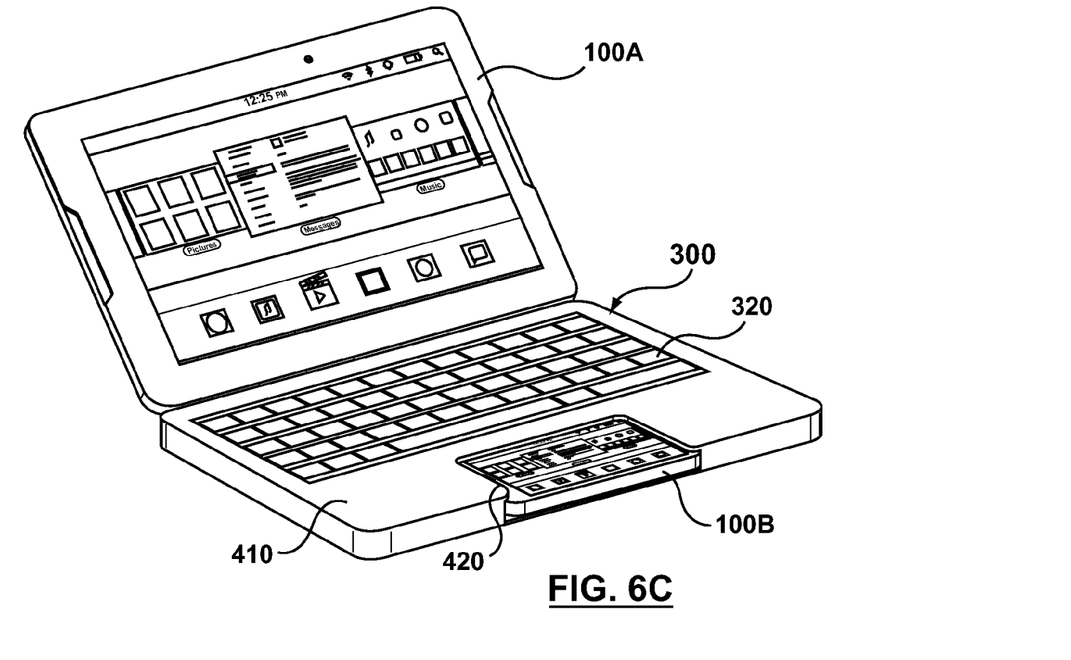
FIG. 6C is a perspective view of a docking station in accordance with one example embodiment of the present disclosure having both a tablet and a handheld electronic device connected thereto.
Figure 6D:
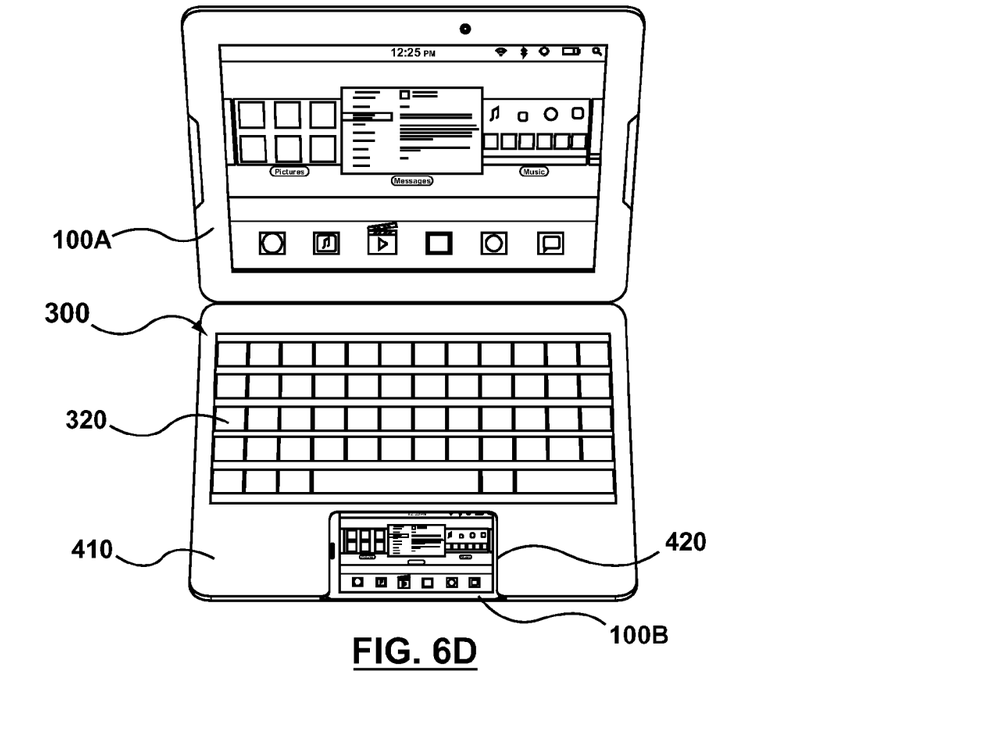
FIG. 6D is a top view of the docking station of FIG. 6C.

Referring now to FIG. 5A and FIG. 5B, example embodiments of information which may be displayed on the display of the handheld electronic device 100B in the input mode and output mode will be described. FIG. 5A illustrates a user interface screen of an input mode of the handheld electronic device 100B in which a virtual touchpad is displayed. When the touch-sensitive display 118 of the handheld electronic device 100B is operated as a navigational input device, the virtual touchpad may be displayed as secondary content on the display 112 of the handheld electronic device 100B as shown in FIG. 5A. Thus, the touch-sensitive display 118 provides output even though the handheld electronic device 100B is in the input mode. The virtual touchpad emulates the function of a conventional trackpad/touch pad of a conventional laptop computer used for navigation, with the possibility of including virtual buttons on the display. In the shown embodiment, the virtual touchpad includes a gesture area 510 for receiving navigational inputs as well as virtual buttons 520A and 520B, labelled "B1" and "B2" respectively in the illustrated embodiments. The touch-sensitive display 118 is configured to recognize conventional touch gestures performed in the gesture area 510, such as the directional gestures described earlier, and cause navigation in a GUI displayed on the display 312 of the docking station 300 or a display of a tablet 100A connected to the docking station 300.

FIG. 5B illustrates a user interface screen of an output mode of the handheld electronic device 100B in which a message list 530 is displayed. The display 112 of the handheld electronic device 100B is used to display secondary content in the output mode. The message list 530 may list all new and unread messages, possibly within a scrollable user interface. Alternatively, the message list 530 may list a predetermined number of the new and unread messages, typically limited by the size of the display area and the size of displayed text. The predetermined number may be fixed or configurable. The messages list 530 typically displays messages in reverse chronological order with the newest messages at the top and followed by older messages. The new and unread messages displayed in the message list 530 may be a consolidation of some or all types of new communications, such as all new emails, instant messages, SMS text messages, MMS messages, calendar reminders/notifications, task reminders/notifications, or other suitable notifications or events managed by a Personal Information Manager (PIM) on the handheld electronic device 100B. Alternatively, the message list 530 may display a consolation of the "inboxes" for emails for one or more communication types with a preview of the new messages or events. In the shown embodiment, the message list 530 consolidates the inboxes of emails (shown as "Messages (10)"), instant messages (shown as "BBM (2)"), calendar reminders/notifications (shown as Calendar (1)) and task reminders/notifications (shown as Tasks (0)) with the preview being in the form of a number of messages/events displayed beside the inbox name in round brackets.

A GUI of a media player application may be displayed in the secondary content area of the display 112 of the handheld electronic device 100B when the handheld electronic device 100B is in the output mode. The GUI may provide a media control screen which includes one or more of virtual media control buttons common to media players (such as rewind/previous track, play/pause, fast-forward/next track), a current track name, or cover (album) art. Alternatively, a playlist of the media player application content may be displayed. The playlist may provide an indication of a currently selected track in the playlist such as the track currently being played. The indication of a currently selected track may be shown, for example, using a checkmark beside the corresponding entry in the playlist or highlighting the corresponding entry in the playlist. The GUI may be configured to switch or toggle between the control screen and playlist in response to designated input.

Alternatively, rather than displaying content on a display of the tablet 100A, the primary content from the handheld electronic device 100B may be displayed on a dedicated display 312 of the docking station 300 in which case the display 312 of the docking station 300 is operated with the handheld electronic device 100B as a primary display for displaying the primary content. The display 112 of the handheld electronic device 100B is operated by the handheld electronic device 100B as a secondary display for displaying the secondary content.

The handheld electronic device 100B, when in the output mode, monitors whether an object such as a user's hand is within the threshold proximity of the handheld electronic device 100B in accordance with proximity data measured by the proximity sensor 136 (712). The handheld electronic device 100B, when in the output mode, also monitors for any activity (e.g., received touch inputs) on the touch-sensitive display 118 (714). The order of operations 712 and 714 could be reversed in other embodiments.

When an object is within the threshold proximity of the handheld electronic device 100B (i.e., the user's hand is near the handheld electronic device 100B), or a touch input is detected on the touch-sensitive display 118, the input mode on the handheld electronic device 100B is enabled (704). If other input devices of the handheld electronic device 100B are used to receive input in the input mode, activity is detected when any of the input devices of the handheld electronic device 100B being used in the input mode receives an input. Thus, enabling the input mode requires satisfying a condition selected from the group consisting of (i) an object is within the threshold proximity of the handheld electronic device 100B, (ii) an input is received on the handheld electronic device 100B, and (iii) an object is within the threshold proximity of the handheld electronic device 100B and an input is received on the handheld electronic device 100B.

The combination of proximity of objects to the handheld electronic device 100B and the duration of inactivity are believed, collectively, to provide a reliable measure of whether the handheld electronic device 100B is being used. However, in other embodiments it is possible that only one of these criteria is used to determine whether the handheld electronic device 100B is being used. When the handheld electronic device 100B is not being used, the display of the handheld electronic device 100B can be used as a secondary display to communicate information.

In the described embodiments, the tablet 100A is used primarily as a display device and the handheld electronic device 100B is used primarily as a controller and a data source for content, e.g. the primary and secondary content which is displayed. In other embodiments, the tablet 100A may act as the controller and/or data source for content, such as the content displayed on the display of the tablet 100A and the display 112 of the handheld electronic device 100B. The handheld electronic device 100B can still be used as an auxiliary input device as described above; however, the tablet 100A acts as the master and the handheld electronic device 100B acts as the slave. In such embodiments, the handheld electronic device 100B could be connected to the docking station 300 wirelessly and may function similar to a remote control for controlling the operation of the tablet 100A. When the handheld electronic device 100B includes a touch-sensitive display 118, the handheld electronic device 100B may emulate a touchscreen-based remote control. In yet other embodiments, the tablet 100A and handheld electronic device 100B could connect wirelessly directly, and without the docking station as an intermediary, and the handheld electronic device 100B could be used as a remote control for controlling the operation of the tablet 100A.

Moreover, in the described embodiments, the output mode on the handheld electronic device 100B is enabled when an object is not within the threshold proximity of the handheld electronic device 100B and when a threshold duration of inactivity has been exceeded (710) as shown in FIG. 7. In other embodiments, the output mode on the handheld electronic device 100B may be enabled when either of these conditions is met, i.e. when an object is not within the threshold proximity of the handheld electronic device 100B or when a threshold duration of inactivity has been exceeded. Thus, enabling the output mode requires satisfying a condition selected from the group consisting of (i) an object is not within the threshold proximity of the handheld electronic device 100B, (ii) a threshold duration of inactivity has been exceeded, and (iii) an object is not within the threshold proximity of the handheld electronic device 100B and a threshold duration of inactivity has been exceeded.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from its spirit or essential characteristics. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method for changing device modes of a first electronic device detachably connected to a second electronic device, the first electronic device including a first display and the second electronic device including a second display, the method comprising:
   when the first electronic device is operating in an input mode, detecting whether an object is within a threshold proximity of the first electronic device, and whether a threshold duration of inactivity on the first electronic device has been exceeded, and changing operation of the first electronic device to an output mode when no object is detected within the threshold proximity and the threshold duration of inactivity has been exceeded; and
   when the first electronic device is operating in the output mode, detecting whether an object is within the threshold proximity of the first electronic device or whether an input is received on the first electronic device, and changing operation of the first electronic device to the input mode when an object is detected within the threshold proximity or when an input is received;
   wherein primary content is displayed on the second display;
   wherein, in the output mode, the first electronic device displays, on the first display, secondary content unrelated to navigation of the primary content; and
   wherein, in the input mode, the secondary content displayed by the first electronic device is entirely replaced by a display of one or more interface elements for navigating the primary content.

2. The method of claim 1, wherein the second electronic device is a docking station and the second display is a display of the docking station.

3. The method of claim 2, wherein the primary content is generated by the first electronic device, and wherein the display of the docking station is operated by the first electronic device as a primary display for displaying the primary content and the first display is operated by the first electronic device as a secondary display for displaying the secondary content.

4. The method of claim 1, wherein the first electronic device is connected to the second electronic device via a docking station.

5. The method of claim 4, wherein the primary content is generated by the first electronic device, and wherein the second display is operated by the first electronic device as a primary display for displaying the primary content and the first display is operated by the first electronic device as a secondary display for displaying the secondary content.

6. The method of claim 1, wherein the primary content is higher priority content and the secondary content is lower priority content.

7. The method of claim 1, wherein the primary content comprises an active application of the first electronic device.

8. The method of claim 7, wherein the secondary content depends on the active application.

9. The method of claim 7, wherein the secondary content comprises a home screen of the first electronic device.

10. The method of claim 7, wherein the secondary content comprises an application switcher tool or widget for switching the active application.

11. The method of claim 7, wherein the secondary content comprises a message list or a notification screen in which notifications are displayed.

12. The method of claim 4, wherein the first electronic device comprises a handheld electronic device and the second electronic device comprises a tablet.

13. The method of claim 12, wherein the handheld electronic device comprises a smartphone with the display of the smartphone being a touch-sensitive display.

14. The method of claim 1, wherein the first display is a touch-sensitive display of the first electronic device, the method further comprising, when the first electronic device is in the input mode, controlling the touch-sensitive display of the first electronic device as an input device for navigating the primary content.

15. The method of claim 14, wherein, in the input mode, the touch-sensitive display of the first electronic device is operated as a navigational input device which interprets touch inputs received by the touch-sensitive display as navigational inputs for navigating a user interface displayed on the second display.

16. The method of claim 14, wherein, in the input mode, the touch-sensitive display of the first electronic device is operated as a navigational input device which interprets touch inputs received by the touch-sensitive display as navigational inputs for navigating a user interface displayed on the second display, the second electronic device being connected to the first electronic device via a docking station.

17. A portable electronic device, comprising: a processor;
   a proximity sensor coupled to the processor; at least one input device coupled to the processor; and
   a first display;
   wherein the processor is configured for, when the portable electronic device is detachably connected to a second electronic device, the second electronic device including a second display:
   when the first electronic device is operating in an input mode, when detecting whether an object is within a threshold proximity of the portable electronic device, and whether a threshold duration of inactivity on the portable electronic device has been exceeded, and changing operation of the first electronic device to an output mode when no object is detected within the threshold proximity and the threshold duration of inactivity has been exceeded; and
   when the first electronic device is operating in the output mode, detecting whether an object is within the threshold proximity of the portable electronic device or whether an input is received on the portable electronic device, and changing operation of the first electronic device to the input mode when an object is detected within the threshold proximity or when an input is received;
   wherein primary content is displayed on the second display;
   wherein, in the output mode, the first electronic device displays secondary content unrelated to navigation of the primary content; and
   wherein, in the input mode, the secondary content displayed by the first electronic device is entirely replaced by one or more interface elements for navigating the primary content.

18. The method of claim 1, wherein, in the output mode, the secondary content displayed by the first display is independent of the primary content displayed on the second display and, in the input mode, the one or more interface elements displayed by the first display is dependent on the primary content.

19. The method of claim 7, wherein in the output mode, the secondary content displayed by the first display comprises a second application independent of the active application and, in the input mode, the one or more interface elements displayed by the first display are for navigation of the active application.

20. The method of claim 19, wherein, in the output mode, the second application displayed by the first display comprises personal information manager (PIM) application, the display of the second application including a display of a consolidation of a plurality of communications managed by the PIM application.

* * * * *